（12）United States Patent
Inturi et al.

(10) Patent No.: US 9,286,917 B1
(45) Date of Patent: Mar. 15, 2016

(54) WRITE POLE FORMED WITH EVAPORATION DEPOSITION

(71) Applicant: Seagate Technology LLC, Cupertino, CA (US)

(72) Inventors: Venkateswara R. Inturi, Shakopee, MN (US); Aly A. Bazama, Bloomington, MN (US); Yong Luo, Plymouth, MN (US); Joseph M. Mundenar, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/701,187

(22) Filed: Apr. 30, 2015

(51) Int. Cl.
*G11B 5/147* (2006.01)

(52) U.S. Cl.
CPC ..................... *G11B 5/147* (2013.01)

(58) Field of Classification Search
CPC .......... G11B 5/147; G11B 5/187; G11B 5/23; G11B 5/31; G11B 5/33
USPC ............... 360/125.3, 125.31, 125.03, 125.09, 360/125.04, 125.17, 125.12, 125.16, 125.14
See application file for complete search history.

(56) References Cited

U.S. PATENT DOCUMENTS

| | | | |
|---|---|---|---|
| 5,719,730 A * | 2/1998 | Chang | B82Y 10/00 360/122 |
| 6,451,514 B1 | 9/2002 | Iitsuka | |
| 7,402,516 B2 | 7/2008 | Ahn et al. | |
| 8,110,085 B2 | 2/2012 | Hsiao et al. | |
| 8,486,285 B2 | 7/2013 | Zhou et al. | |
| 8,652,763 B2 | 2/2014 | Jain et al. | |
| 8,670,213 B1 | 3/2014 | Zeng et al. | |
| 2004/0248398 A1* | 12/2004 | Ahn | H01L 21/2855 438/629 |
| 2008/0072417 A1* | 3/2008 | Hsu | G11B 5/1278 29/603.12 |
| 2009/0162699 A1* | 6/2009 | Sasaki | G11B 5/3116 428/812 |
| 2011/0086240 A1* | 4/2011 | Xiang | G11B 5/1278 428/810 |
| 2011/0147222 A1* | 6/2011 | Pentek | G11B 5/1278 205/170 |
| 2013/0019467 A1* | 1/2013 | Zhang | G11B 5/3116 29/603.07 |
| 2013/0161185 A1* | 6/2013 | Mao | G11B 5/3163 204/192.34 |
| 2014/0134404 A1 | 5/2014 | Jain et al. | |
| 2014/0326699 A1* | 11/2014 | Hsiao | G11B 5/39 216/22 |

* cited by examiner

*Primary Examiner* — Allen T Cao
(74) *Attorney, Agent, or Firm* — Hall Estill Attorneys at Law

(57) ABSTRACT

A write pole may be formed by first depositing a dielectric layer onto a substrate and then patterning the dielectric layer to form a trench with a write pole shape. The trench is subsequently filled with the evaporation deposition of a magnetic material to form a write pole. The trench may have a greater depth dimension than width dimension.

20 Claims, 3 Drawing Sheets

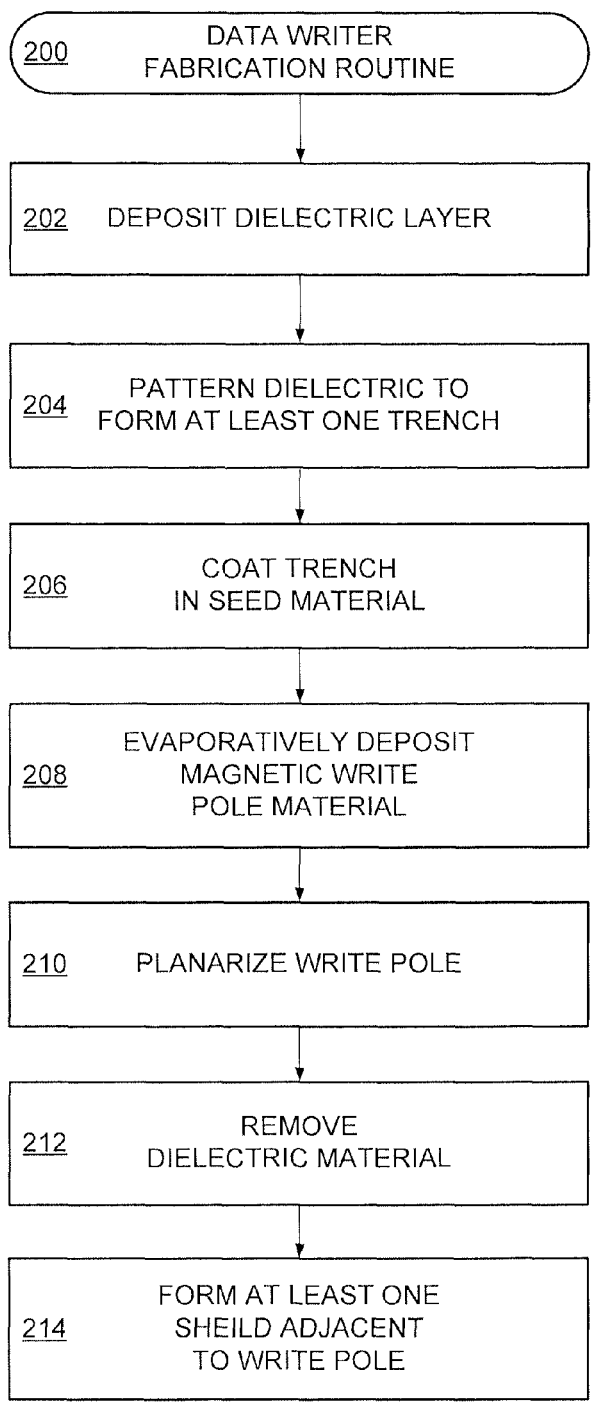
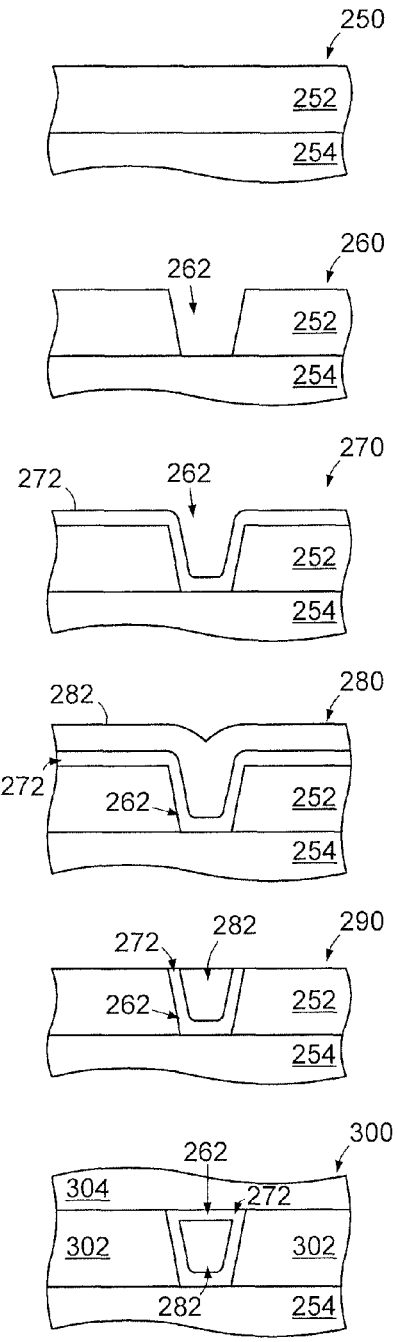
FIG. 5A                    FIG. 5B

WRITE POLE FORMED WITH EVAPORATION DEPOSITION

SUMMARY

A deposition system, in accordance with various embodiments, forms a write pole by first depositing a dielectric layer onto a substrate and then patterning the dielectric layer to form a trench with a write pole shape. The trench is subsequently filled with the evaporation deposition of a magnetic material to form a write pole.

BRIEF DESCRIPTION OF THE DRAWINGS

FIGS. 5A and 5B respectively provide a flowchart and representative illustrations of an example data writer fabrication routine that may be conducted in accordance with various embodiments.

DETAILED DESCRIPTION

Continued industry and consumer emphasis on greater data storage capacity has increased the density of data on a data storage medium. In design, the size of data recording components, such as a write pole, are reduced to accommodate an increased data density. However, constructing data recording components with small physical dimensions, such as nanometer scale lengths, can be difficult as voids and non-uniformity can drastically alter the operation of the data recording component. Hence, there is a continued interest in systems and methods capable of forming accurate small scale data recording components.

Accordingly, a data recording component fabrication system can form a write pole, in accordance with some embodiments, by depositing a dielectric layer onto a substrate and subsequently patterning the dielectric layer to form a trench with a write pole shape that is then filled with magnetic material via evaporation deposition to provide a write pole. The use of evaporation deposition in a damascene fabrication process provides a write pole free of voids and with magnetic properties conducive to high data density data storage environments. Moreover, the isotropic deposition characteristics of evaporative deposition can be collimated to completely fill a write pole trench despite a narrow shape and small width. Initially, it is noted that magnetic material may theoretically be deposited with chemical vapor deposition (CVD). However, practical use of CVD is plagued by slow formation times and usually end up with compressive residual stress in the films. Compressive residual stress does not go well with positive magnetostriction layer like FeCo. In this combination of positive magnetostriction and compressive residual stress, magnetic films often end up with high coercivity and magnetic dispersion that are not suitable for data writer applications. In addition, there is no literature available where CVD magnetic films were deposited with an aligning magnetic field to create uniaxial anisotropy which is preferred for data writer materials. Thus, the tuned use of evaporation deposition can provide practical industry formation of write poles with reduced physical dimensions and high magnetic moments conducive to data storage devices with high data densities.

Figure 1:
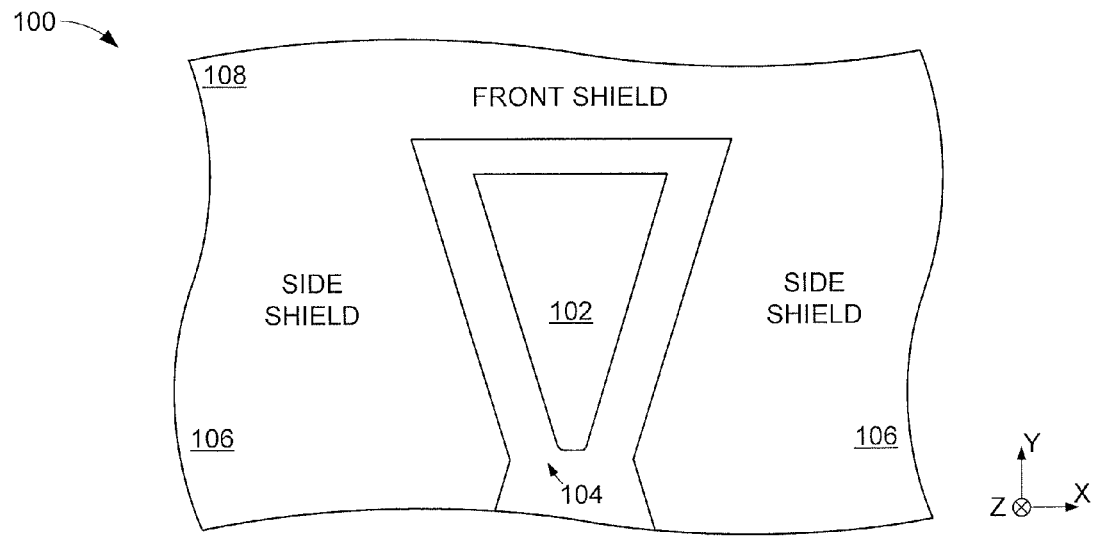
FIG. 1 is an air bearing view line representation of a portion of an example data writer constructed in accordance with various embodiments.

FIG. 1 is an air bearing view line representation of a portion of an example data writer 100 arranged in accordance with various embodiments. The data writer 100 may be incorporated into a transducing head that consists of other data storage components, such as a magnetoresistive data reader, that operate to sense data bits stored on a rotating data storage medium. The data writer 100 has a write pole 102 surrounded by a non-magnetic gap material 104 that separates the magnetic material of the write pole 102 from the soft magnetic material of side 106 and front 108 shields. Although the shields 106 and 108 are shown in FIG. 1 as a single, continuous structure, the shields 106 and 108 can be differently configured without limitation, such as individual layers contacting one another via seams.

The size and shape of the write pole 102, and shields 106 and 108, can be tuned to provide a magnetic writing extent capable of writing a selected magnetic polarity onto a data storage medium as a single data bit. However, increasing data density has caused the write pole 102 to scale down to nanometer scale dimensions, such as less than 25 nm widths and lengths on an air bearing surface. Existing write pole 102 fabrication methods are unreliable in forming quality nanometer scale magnetic structures.

Figure 2:
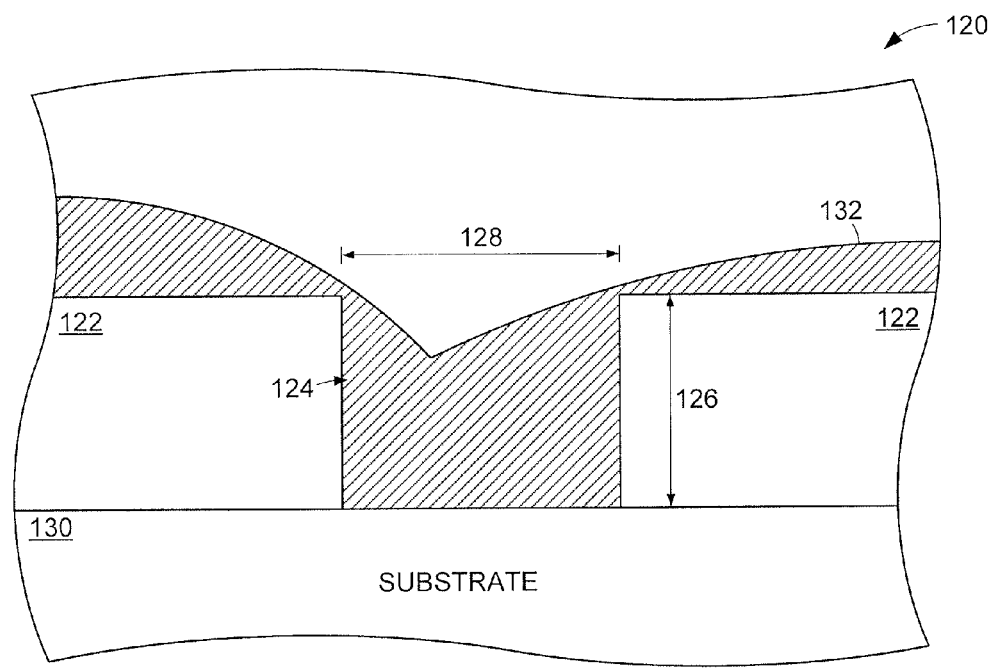
FIG. 2 shows a line representation of a portion of an example data writer fabrication system configured in accordance with some embodiments.

FIG. 2 displays a line representation of a portion of a write pole fabrication system 120 that illustrates some difficulties in constructing a reduced scale magnetic structure. In contrast to metallization processes that use a subtractive etch to form a magnetic structure, a damascene process utilizes a negative pattern in a dielectric layer 122 to form a trench 124 generally shaped like a write pole.

The shape and size of the trench 124 can cause some physical vapor deposition (PVD) and sputtering techniques to insufficiently fill the trench 124 and form a write pole. For example, the trench 124 can be narrow, as defined by having a depth 126 that is greater than the width 128, and/or have high sidewall angles, such as greater than 70° with respect to the underlying substrate 130, that can result in an unfilled trench 124 and non-uniform trench coverage, as shown, when the magnetic material 132 is deposited by some PVD or sputtering techniques, such as pulsed laser, electron beam, and cathodic arc deposition. The lack of complete and uniform trench 124 coverage can correspond with degraded magnetic properties, like magnetic moment and flux density, as well as structural defects, like voids.

Figure 3A:
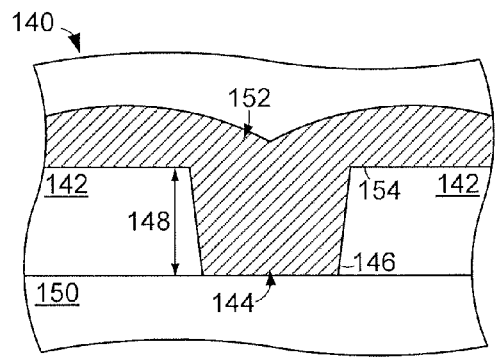
FIGS. 3A and 3B respectively display line representations of portions of an example data writer fabrication system arranged in accordance with assorted embodiments.
Figure 3B:
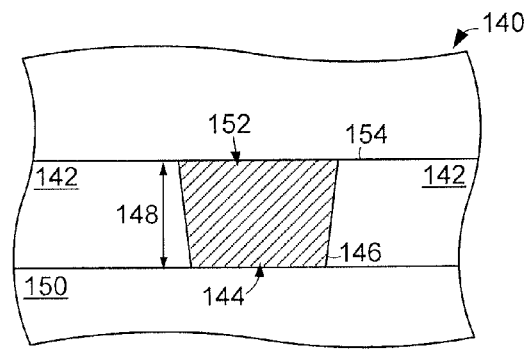

FIGS. 3A and 3B respectively display line representations of portions of an example data writer fabrication system 140 configured in accordance with assorted embodiments. A dielectric layer 142 is patterned to define a trench 144 with at least two sidewalls 146. It is contemplated that the sidewalls 146 can be parallel or complementary angles throughout the depth 148 of the trench 144. As a non-limiting example, the sidewalls 146 may converge to a point above an underlying substrate 150 or extend from the substrate 150 at a predetermined angle, such as 70-90°.

The shape and dimensions of the trench 144 define the shape of a portion of a write pole, such as a write pole tip that is to be positioned on an air bearing surface (ABS), like pole 102 of FIG. 1. Through the use of highly collimated evaporation deposition, magnetic material 152 completely fills the trench 144. As shown in FIG. 3A, the magnetic material 152 overflows the trench 144 to continuously extend above a planar top surface 154 of the dielectric layer 142. It is noted that one or more deposition events may occur to completely fill the trench 144. That is, a plurality of evaporation depositions of the magnetic material 152 may be conducted to bring the magnetic material 152 above the planar top surface 154.

In FIG. 3B, one or more planarization techniques, such as chemical mechanical polishing and/or lapping, have occurred to remove at least portions of the magnetic material 152 and create a top surface of a write pole, which may coincide with the trailing surface 106 of FIG. 1. The formation of the write pole top surface can be complemented by removal of the dielectric layer 142 and/or substrate 150 to allow at least one shield to be positioned adjacent the write pole.

Figure 4A:
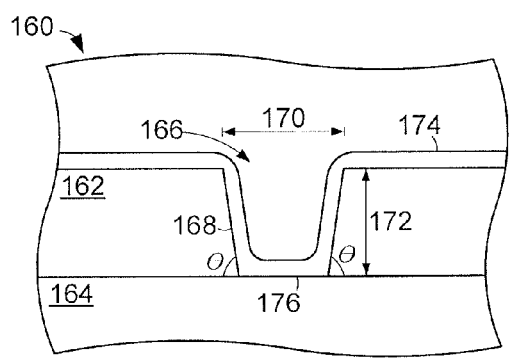
FIGS. 4A and 4B respectively depict line representations of portions of an example data writer fabricated in accordance with some embodiments.
Figure 4B:
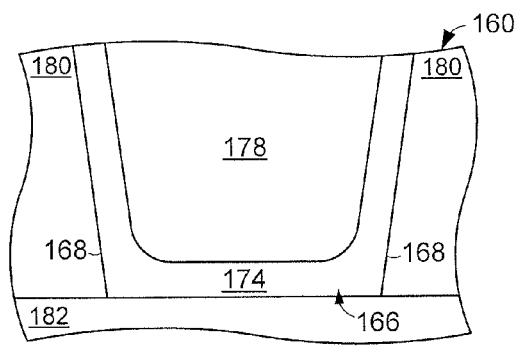

FIGS. 4A and 4B respectively illustrate line representations of portions of an example data writer 160 constructed in accordance with various embodiments. A dielectric layer 162 is shown in FIG. 4A atop a substrate 164 and patterned to provide a trench 166 with at least a pair of sidewalls 168 continuously extending through the dielectric layer 162. Each sidewall 168 is canted with respect to the substrate 164 at a predetermined angle θ, such as 75°, which defines a trench width 170 that varies along the trench depth 172 down to the substrate 164. Although a trapezoidal shape is created by the width 170 and depth 172, a rectangular or rhomboid shape can alternatively be provided, without limitation.

In accordance with various embodiments, the trench 166 is coated with a seed layer 174 that continuously extends throughout the sidewalls 168 and bottom 176 of the trench 166. The seed layer 174 can be any number of magnetic or non-magnetic materials, such as Ru, $Al_2O_3$, and Ta, that aid in the magnetic characteristics of a write pole material 178 formed thereon by evaporation deposition. As provided in FIG. 4B, the seed layer 174 can allow the write pole material 178 to have predetermined magnetic moment and crystallographic characteristics that optimize the emission of magnetic flux to write a data bit.

It is contemplated that the seed layer 174 provides a non-magnetic gap that separates the write pole 178 from side 180 and leading 182 shields. In some embodiments, the substrate 164 is the leading shield 182 while other embodiments omit the leading shield 182 and position non-magnetic material proximal the bottom 176 of the write pole 178. Regardless of the number and shape of the shields 180 and 182, the write pole 178 may be processed to alter the exterior shape of the write pole 178 and/or gap material 184. For instance, the write pole trailing edge 186 can be configured into one or more linear or curvilinear surfaces.

FIGS. 5A and 5B respectively display an example data writer fabrication routine 200 and representative line illustrations in accordance with some embodiments. A substrate is initially provided for step 202 to deposit at least one dielectric layer that is patterned in step 204 to provide one or more trenches. Example data writer 250 of FIG. 5B shows how a non-magnetic dielectric layer 252 is positioned atop a substrate 254 and data writer 260 illustrates how a trench 262 continuously extends through the dielectric layer 252 to the substrate 254.

Step 206 proceeds to coat the trench in one or more seed layer(s) that may have a uniform or varying thickness while coating the entire trench, as shown by seed layer 272 of data writer 270. With the trench coated with at least one seed material, step 208 deposits magnetic write pole material, such as FeCo, with one or more evaporation deposition processes. That is, the write pole material, as illustrated as layer 282 of example data writer 280, can be formed with a single deposition or the deposition of multiple layers of the same material. It is noted that the utilization of evaporation deposition forms the write pole material without voids and thickness variations despite the trench having nanometer scale dimensions, a narrow width, and a high angle trench sidewalls, which can plague write pole formation with other deposition techniques.

The formation of the write pole allows step 210 to planarize the deposited materials to remove at least portions of the write pole material and form a linear top surface of the write pole. Example writer 290 of FIG. 5B illustrates how top surface 292 can expose portions of the write pole 282, seed layer 272, and dielectric material 252. The routine 200 advances to step 212 to remove some, or all, of the dielectric material to allow at least one magnetic shield to be formed by step 214 adjacent to the write pole. The example write pole 300 shows how the dielectric portions 252 of the fabrication stack have been removed, such as by etching, lapping, or polishing, to make way for side shields 302 to be formed on opposite lateral sides of the write pole 282 and a front shield 304 to be formed atop the side shields.

It is noted that the various steps of routine 200 are not required or limiting and any number of decisions and steps can be added just as the existing steps can be changed and removed. For example, additional steps can be conducted before step 214 to surround the write pole with non-magnetic gap material and form the front shield of multiple different materials, such as seed and shielding layers. As another non-limiting example, additional steps can implement the write pole into a transducing head that is suspended to write data bits on a data storage medium portion of a data storage device.

Through the use of evaporation deposition, the physical size of a write pole can be decreased while maintaining high structural integrity and magnetic characteristics conducive to high data density data storage environments. The tuned use of evaporation deposition allows a write pole to be formed in a trench having a narrow shape where the width is smaller than the depth. The conformal deposition of write pole material via evaporation deposition further allows high trench sidewall angles, such as greater than 70°, to be completely coated to form a shaped write pole. In contrast to the deposition of material via other means for a damascene process, the utilization of collimated evaporation deposition provides optimized fabrication time along with the ability to construct precise write pole shapes, such as shapes with less than 20 nm widths and lengths on an air bearing surface.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a trench defining a write pole shape, the trench continuously extending a first depth to a substrate, having a varying width along the first depth, and filled with a magnetic material via evaporation deposition.

2. The apparatus of claim 1, wherein the trench is a damascene trench.

3. The apparatus of claim 1, wherein the magnetic material positioned within the trench is void-less.

4. The apparatus of claim 1, wherein the trench has a uniform width of 10 nm or less.

5. The apparatus of claim 1, wherein the trench continuously extends a first depth to a substrate, the trench having a symmetrical shape along the first depth.

6. The apparatus of claim 1, wherein the trench continuously extends a first depth to a substrate, the trench forming a trapezoidal shape along the first depth.

7. The apparatus of claim 1, wherein the trench continuously extends a first depth to a substrate, the trench comprising at least one sidewall angled at 75-90° relative to the substrate.

8. A method comprising:
depositing a dielectric layer onto a substrate;
patterning the dielectric layer to form a trench with a write pole shape; and
filling the trench with a magnetic material with evaporation deposition to form a write pole.

9. The method of claim 8, wherein the magnetic material comprises FeCo.

10. The method of claim 8, wherein the evaporation deposition collimates the magnetic material.

11. The method of claim 8, wherein the magnetic material is electrodeposited in combination with the evaporation deposition.

12. The method of claim 8, wherein the magnetic material has 25 Oe coercivity in the trench.

13. The method of claim 8, wherein the magnetic material is annealed at an elevated temperature after being deposited in the trench.

14. The method of claim 8, wherein the trench is coated with a continuous seed film prior to being filled with the magnetic material.

15. A method comprising:
depositing a dielectric layer onto a substrate;
patterning the dielectric layer to form a trench with a write pole shape;
filling the trench with a magnetic material with evaporation deposition to form a write pole;
removing portions of the dielectric layer; and
forming at least one shield on the substrate adjacent the write pole.

16. The method of claim 15, wherein the portions of the dielectric layer are removed to form a planar surface continuously extending across the trench.

17. The apparatus of claim 15, wherein the evaporation deposition is conducted in multiple stages.

18. The apparatus of claim 15, wherein the trench has a greater depth than width.

19. The apparatus of claim 15, wherein the magnetic material completely fills the trench and continuously extends beyond a depth and width of the trench.

20. The apparatus of claim 15, wherein the trench has a plurality of sidewalls each oriented perpendicular to the substrate.

* * * * *